F. W. WOLF.
Improvement in Process and Apparatus for Forming Mash.

No. 125,645. Patented April 9, 1872.

Witnesses.
Harry King.
Phil T. Dodge.

Inventor.
Fred. W. Wolf
by Dodge & Munn
his attys.

UNITED STATES PATENT OFFICE.

FRED. WILLIAM WOLF, OF CHICAGO, ILLINOIS.

IMPROVEMENT IN PROCESSES AND APPARATUS FOR FORMING MASH.

Specification forming part of Letters Patent No. 125,645, dated April 9, 1872.

SPCIFICATION.

*To all whom it may concern:*

Be it known that I, FRED. WILLIAM WOLF, of Chicago, in the county of Cook and State of Illinois, have invented certain Improvements in Processes and Apparatus for Forming Mash, of which the following is a specification, reference being had to the accompanying drawing.

My invention consists in a novel process of forming and cooling grain-mashes for distillers and brewers; and in a steam-tight vessel with hollow walls, and an internal coiled pipe for carrying out my process, the grain being placed in the vessel and subjected to the action of steam at a high pressure until the mash is formed, and then cooled by producing a vacuum in the vessel, and passing cold air or water through the walls and pipe.

Figure 1:
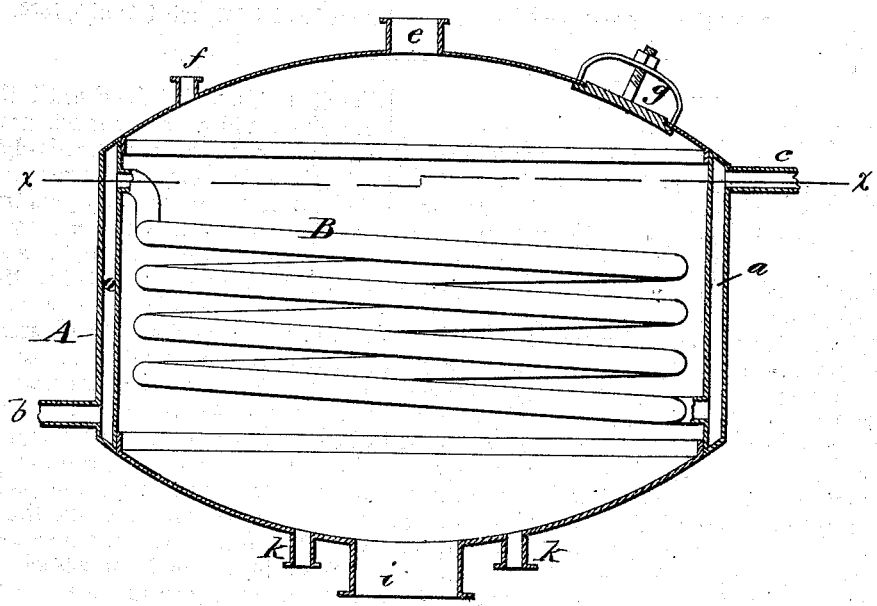
Figure 2:
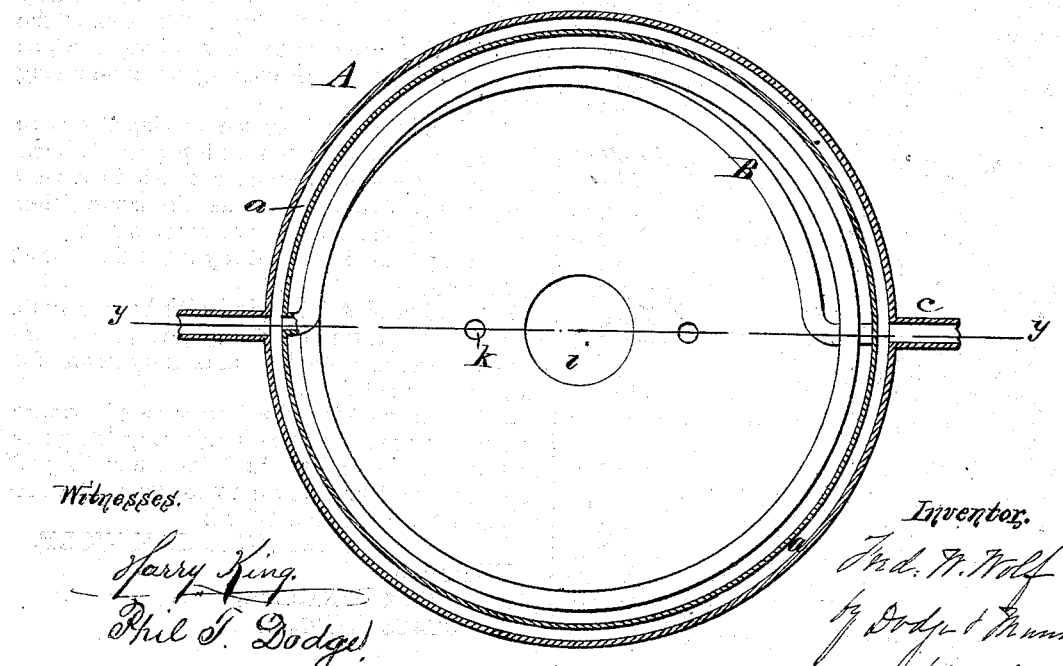

Figure 1 is a vertical section through the center of my apparatus, and Fig. 2 a horizontal section of the same on the line $xx$ of Fig. 1.

In constructing the apparatus I first provide a cylindrical body or vessel, A, having hollow side walls $a$, and within this vessel place a coiled pipe, B, and connect its ends with the interior of the hollow walls, as shown. I also connect with the hollow walls, from the outside, two pipes, $b$ and $c$, on opposite sides of the body—one at the top, and the other at the bottom. The top of the body I provide with a large neck, $e$, through which to introduce the materials, and with a small neck, $f$, to which to apply an air-pump; and also with a man-hole, $g$, through which access may be had to the interior. The lower end of the body I provide with a large neck, $i$, through which to discharge the mash when prepared, and with two small necks or pipes, $k$, for the admission of the steam.

In using the apparatus, the corn or other material of which the mash is to be prepared is placed in the vessel, and then the vessel closed and steam at a high pressure admitted through the pipes $k$, so as to permeate the entire mass and fill what vacant space there may be in the top of the vessel. This pressure of the steam is maintained until the material is dissolved and a proper mash produced, which will occur in a comparatively short time, owing to the combined pressure and heat of the steam, which quickly penetrates and softens the grain. The steam may be simply admitted to the vessel so as to keep it filled; or it may be allowed to enter at the bottom and flow out through the top after passing through the material therein. The latter plan may, in practice, be found the best, as the current of steam flowing up through the mass of grain will produce a continual agitation of the same, and thereby aid its dissolution.

After the mash is prepared or reduced to the proper consistency, it is cooled by forcing cold water or air through the hollow walls, and applying an air-pump so as to produce a vacuum in the body or vessel. It is obvious that the mere passage of the cold water or air through the walls and pipe will produce a partial vacuum in the vessel, by condensing the steam or vapor therein; and this result may be aided by making the top and bottom of the vessel with hollow walls to receive water, so as to produce a larger cooling or condensing surface.

My invention enables me to dispense with the expensive apparatus and processes heretofore in use—to produce a mash in a very short space of time, and to use the grain either with or without grinding or cracking it.

Having thus described my invention, what I claim is—

1. The vessel A, provided with hollow walls and with the internal coiled pipe B, when constructed and arranged substantially as and for the purpose set forth.

2. The herein-described process of forming and cooling mash by first subjecting the grain to the action of steam and then shutting off the steam and producing a vacuum in the vessel, substantially as set forth.

FRED. WILLIAM WOLF.

Witnesses:
FRANZ DENNULEE,
CYRUS J. CORSE.